March 28, 1939.　　　J. W. TATTER　　　2,152,104

BRAKE DEVICE

Original Filed Feb. 27, 1928　　　6 Sheets-Sheet 1

Witness:
William P. Kilroy

Inventor:
John W. Tatter
By Hill & Hill
Attys

March 28, 1939. J. W. TATTER 2,152,104
BRAKE DEVICE
Original Filed Feb. 27, 1928 6 Sheets-Sheet 2

Witness:
William P. Kilroy

Inventor:
John W. Tatter
Hill & Hill

March 28, 1939.  J. W. TATTER  2,152,104
BRAKE DEVICE
Original Filed Feb. 27, 1928   6 Sheets-Sheet 3
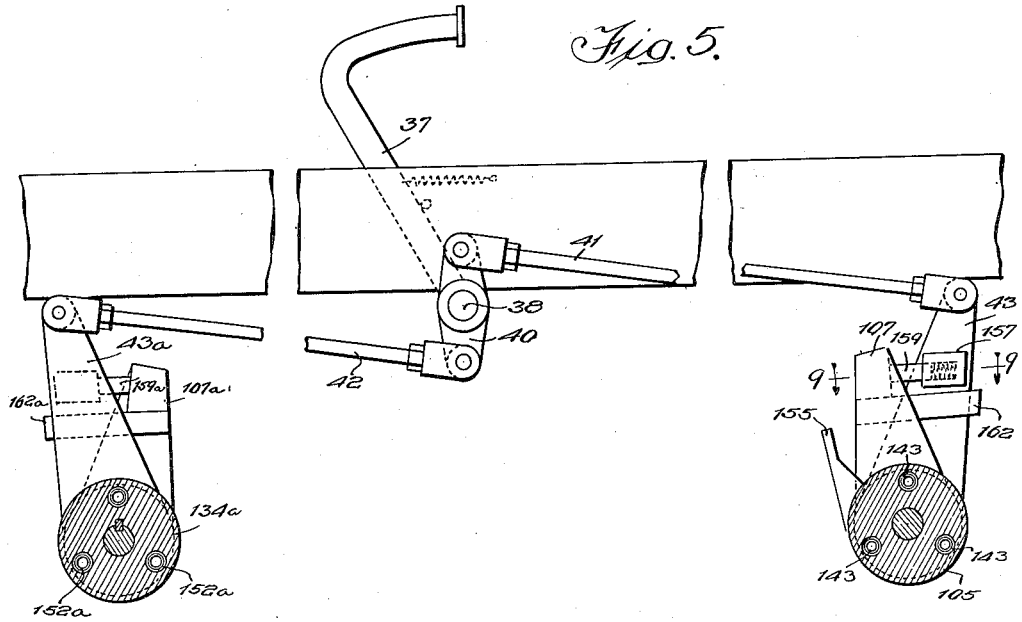
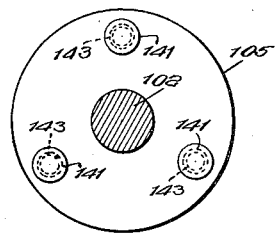
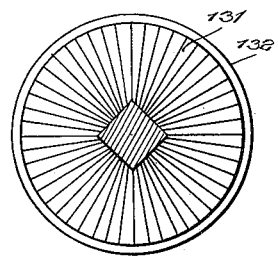
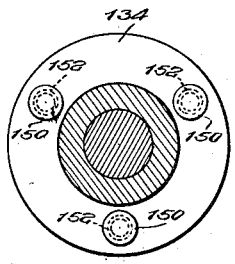
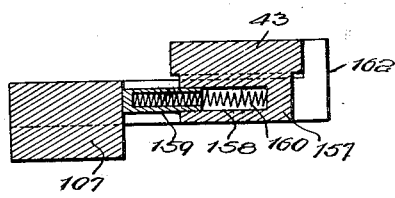
Witness:
William G. Kilroy
Inventor:
John W. Tatter
By Hill & Hill
Attys.

March 28, 1939. J. W. TATTER 2,152,104
BRAKE DEVICE
Original Filed Feb. 27, 1928 6 Sheets-Sheet 4
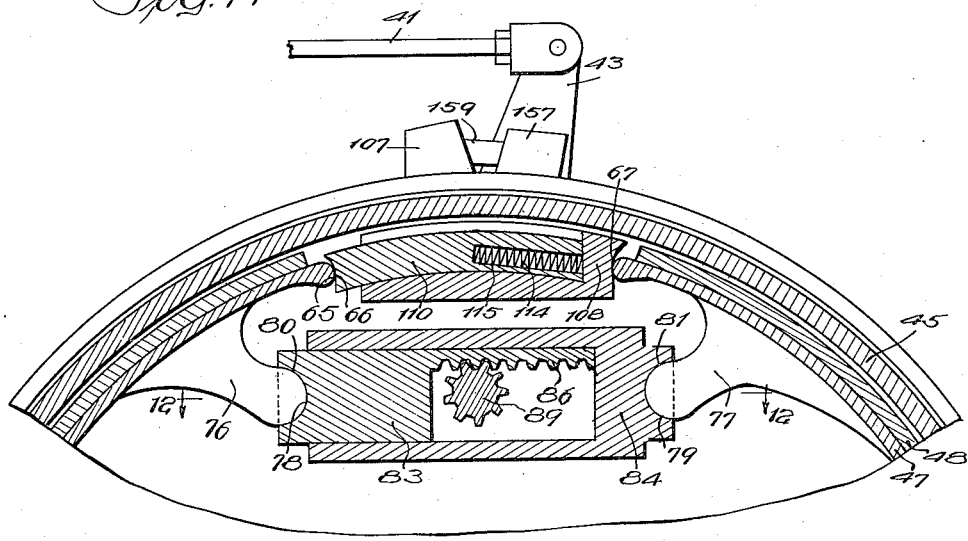
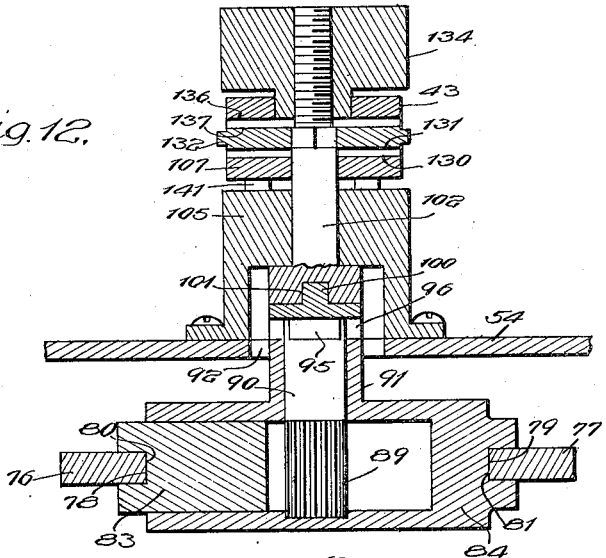
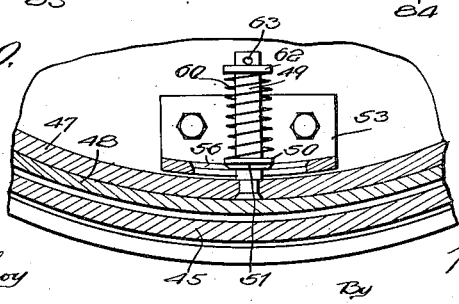
Witness:
William P. Kilroy
Inventor:
John W. Tatter

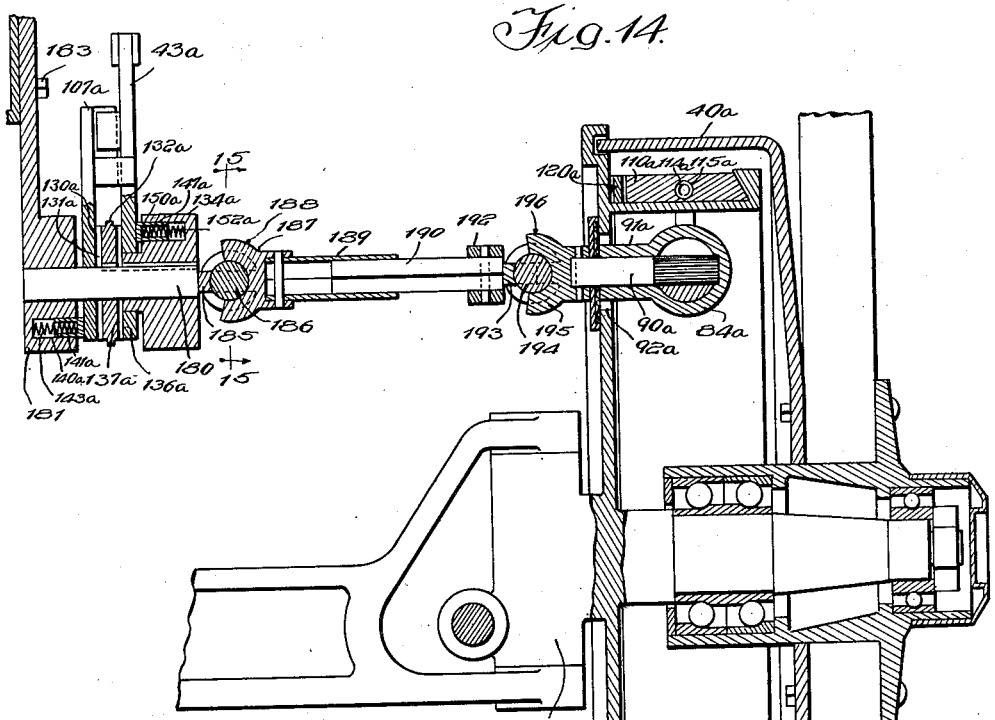
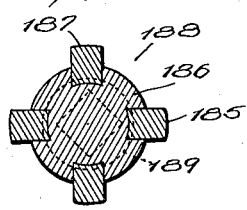
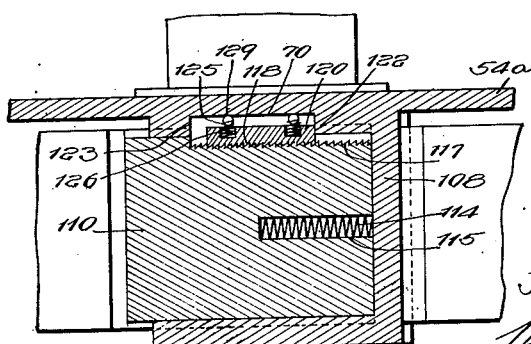

March 28, 1939.   J. W. TATTER   2,152,104
BRAKE DEVICE
Original Filed Feb. 27, 1928   6 Sheets-Sheet 6
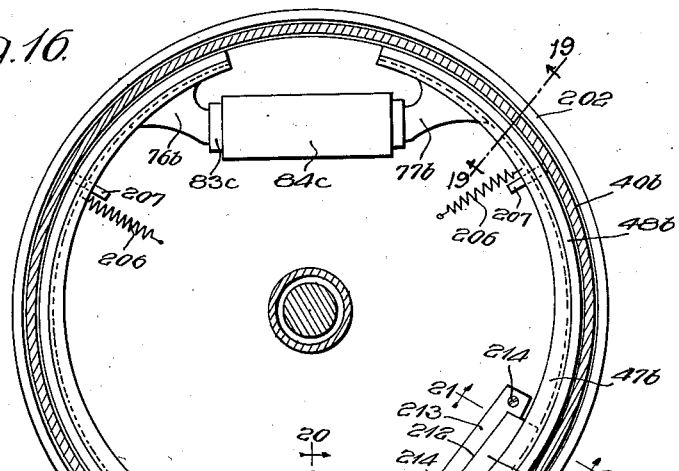
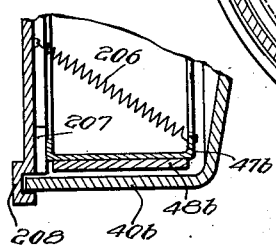
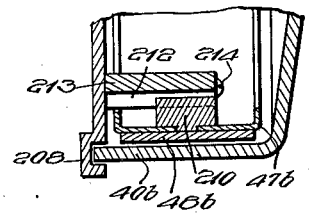
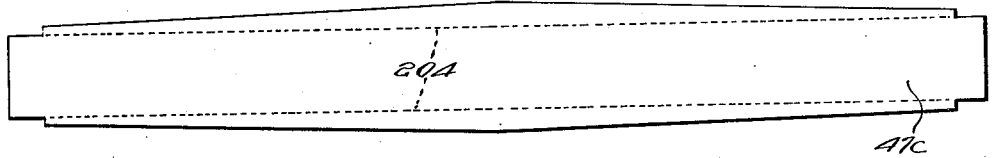
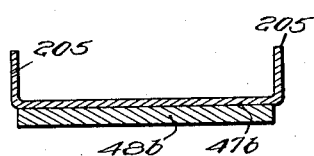
Inventor:
John W. Tatter Patented Mar. 28, 1939

2,152,104

UNITED STATES PATENT OFFICE 2,152,104

BRAKE DEVICE

John W. Tatter, Akron, Ohio, assignor to Bendix Products Corporation, South Bend, Ind., a corporation of Indiana Refiled for abandoned application Serial No. 257,397, February 27, 1928. This application June 19, 1936, Serial No. 86,064

2 Claims. (Cl. 188—78)

This is a refile of my abandoned application Serial No. 257,397, filed February 27, 1928.

My invention relates broadly to brake devices and more particularly to brake devices for use in connection with automobiles, or the like.

A particular object of the invention is to provide brakes that are compact, durable, efficient and satisfactory for use wherever found applicable.

Another particular object of the invention is to provide improved braking mechanism which includes means for automatically taking up slack or wear.

Another particular object of the invention is to provide improved means for holding a brake band in alignment with a brake drum.

Another particular object of the invention is to provide a brake band of improved construction.

Still another object of the invention is to provide improved means for displacing a brake band relative to its drum to have it apply a braking effect to the drum.

Another object of the invention is to provide an overlapping of the wrap of the most effective portions of the brake band when applied to the brake drum to retard the movement of the vehicle in a forward or rearward direction.

A further object of the invention is to provide a construction and arrangement whereby the efficiency of the braking action when the band is applied to retard the movement of a vehicle either in a forward or rearward direction is approximately proportional to the normal requirements in the nomal operation of the vehicle.

A further object of the invention is to provide a construction and arrangement whereby the efficiency of the brake when applied to retard the movement of the vehicle in a rearward direction is substantially proportional to its efficiency when actuated to retard the movement of the vehicle in a forward direction.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 5 is an enlarged section taken on line 5—5 of Fig. 1;

Fig. 6 is a section taken on line 6—6 of Fig. 3;

Fig. 7 is a section taken on line 7—7 of Fig. 3;

Fig. 8 is a section taken on line 8—8 of Fig. 3;

Fig. 9 is a section taken on line 9—9 of Fig. 5;

Fig. 10 is a section taken on line 10—10 of Fig. 3;

Fig. 11 is an enlarged section taken on line 11—11 of Fig. 1;

Fig. 12 is a section taken on line 12—12 of Fig. 11;

Fig. 13 is an enlarged section taken on line 13—13 of Fig. 2;

Fig. 14 is an enlarged section taken on line 14—14 of Fig. 1;

Fig. 15 is a section taken on line 15—15 of Fig. 14;

Fig. 16 is a section taken through a brake which embodies another form of the invention;

Fig. 17 shows a blank from which a brake band of the kind shown in Fig. 16 may be formed;

Fig. 18 is a section taken on line 18—18 of Fig. 16;

Fig. 19 is a section taken on line 19—19 of Fig. 16;

Fig. 20 is a section taken on line 20—20 of Fig. 16; and

Fig. 21 is a section taken on line 21—21 of Fig. 16;

Figure 1:
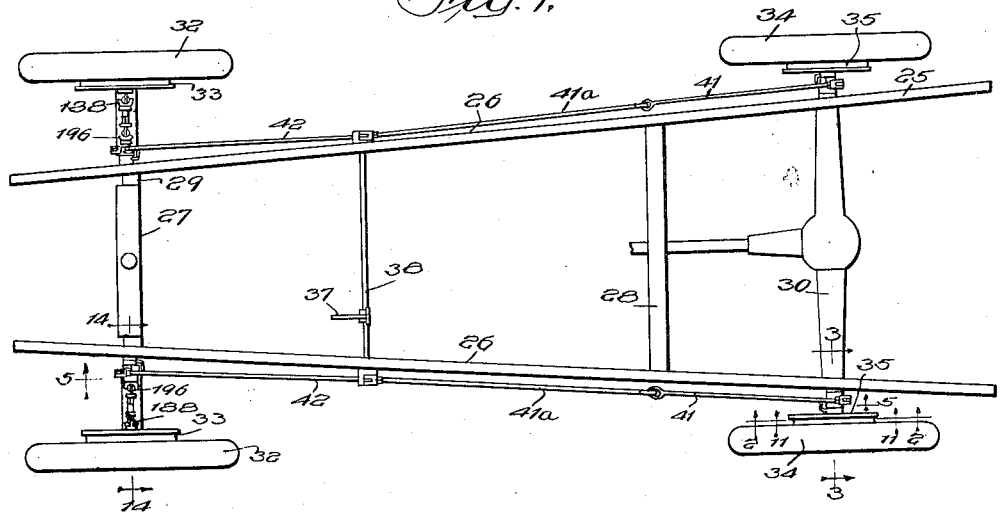
Fig. 1 is a plan view of a chassis upon which brake mechanism embodying my invention is installed.

Referring for the present to Fig. 1, the reference character 25 designates generally a chassis comprising longitudinal frame members 26 and transverse frame members 27 and 28. The chassis also comprises a front axle 29 and a rear axle housing 30. Carried by the front axle 29 are front wheels 32 provided with brakes 33 and associated with the rear axle housing 30 are rear wheels 34 provided with brakes 35. At 37 I have shown a brake or foot pedal which is operatively connected to the brakes 33 and 35 by means comprising a shaft 38 rotatably journaled in the chassis and provided at its ends with levers 40, the levers 40 being constrained to rotate with the shaft 38. As best illustrated in Figs. 1 and 5, the levers 40 are connected by rods 41 and 41a to levers 43, and by rods 42 to levers 43a, the levers 43 and 43a being associated with the brakes 35 and 33, respectively. Each rod 41 is connected to one of the rods 41a by a hook and eye arrangement which permits relative displacement between the levers 40 and 43. The construction is such that when the brake or foot pedal 37 is depressed or angularly displaced in a counterclockwise direction (Fig. 5) this movement is transmitted to the brakes 33 and 35 through the rods 42, 41 and 41a, and the brakes function in the usual manner to stop the vehicle or to cut down its speed.

Figure 2:
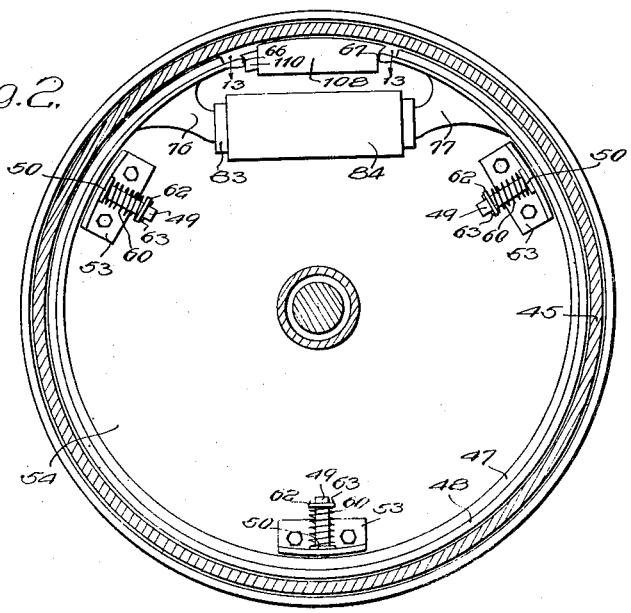
Fig. 2 is an enlarged section taken on line 2—2 of Fig. 1.
Figure 3:
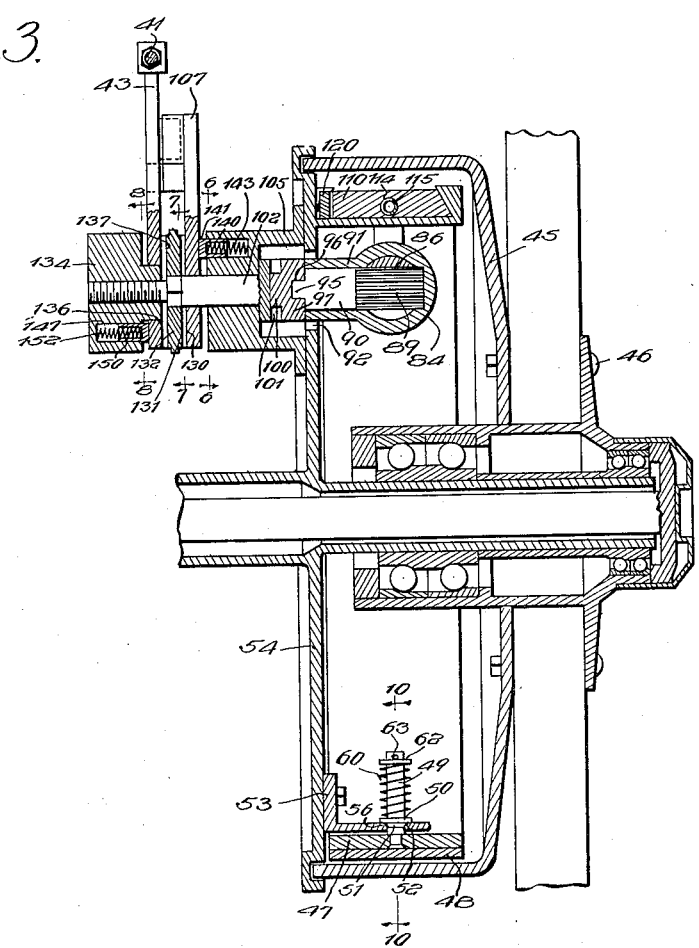
Fig. 3 is an enlarged section taken on line 3—3 of Fig. 1.

The construction of the rear brakes 35 is illustrated in Figs. 2 to 13, inclusive. Referring to Figs. 2 and 3, it will be noted that each rear brake 35 preferably comprises a drum 45 which is rigidly secured by bolts 46, or the equivalent, to its associated rear wheel. Disposed within the drum 45 is a brake band 47 which is of maximum thickness at a point substantially midway between its ends, the construction being such that the band tapers gradually to a smaller thickness at its ends. This construction is more fully described in my copending application, Serial No. 145,970, filed Nov. 3, 1926, which has subsequently become United States Patent No. 1,814,574 issued July 14, 1931. The outer surface of the band 47 is preferably provided with a brake or friction lining 48 engageable with the interior surface of the drum 45 and rigidly secured to the band are a plurality of pins 49 upon which collars 50 are slidably journaled, the collars 50 being provided with frusto-conical surfaces 51 engageable with surfaces 52 provided upon brackets 53. The brackets 53 are rigidly secured to a plate or disc 54 which, in this instance, is formed integral with the rear axle housing 30. It will be noted that the plate or disc 54 closes one end of the drum 45. Each pin 49 projects through a slot 56 formed in its bracket 53, there being a separate bracket 53 for each of the pins 49. A compression spring 60 is carried by each pin 49, the compression spring being interposed between the collar 50 carried by the pin and a washer 62 held upon the pin by a cotter pin 63. Obviously, the compression spring 60 tends to hold the frusto-conical surface 51 of the collar 50 in engagement with the surface 52 upon the associated bracket 53 and also tends to contract the brake band 47. The brake band 47 may be made of any suitable material that is preferably somewhat resilient so that it normally assumes the form wherein it is shown in Fig. 2 but it is sufficiently flexible so that it may be expanded to bring its friction lining 48 into engagement with the interior surface of the associated drum 45.

As best shown in Fig. 11, the ends of each brake band 47 are preferably rounded as at 65, one of the ends being arranged to ride in an arcuate groove 66 formed in a slide 110 and the other of the ends being arranged to ride in an arcuate slot 67 formed in the block 108. The block 108 is preferably formed integral with the disc or plate 54 and the slide 110 is preferably journaled in the block 108. A compression spring 114 disposed in a bore 115 which is formed in the slide 110 urges the slide to the left (Fig. 11). Referring to Fig. 13, it will be noted that a recess 70 is formed in the block 108 and that a slide 120 is mounted in the recess and is arranged so that it may travel from a position wherein it abuts a shoulder 122 to a position wherein it abuts a shoulder 123. The slide 110 is provided with teeth 117 which engage teeth 118 formed upon the block 120. Compression springs 125 seated in recesses 126 formed in the slide 120 yieldingly urge the slide 120 toward the slide 110 to hold the teeth 118 in engagement with the teeth 117. Steel balls 129 are preferably inserted between the outer ends of the springs 125 and the surface in the block 108 against which the springs act. The balls 129 function as anti-friction devices and permit the slide 120 to move freely between the shoulders 122 and 123 when it is urged in either direction by the slide 110. The construction is preferably such that when the brake lining 48 has not been worn to any appreciable extent and the brake band has not been expanded so that the lining engages the interior surface of the drum 40, the slide 120 occupies the position wherein it is shown in Fig. 13 and engages the shoulder 122. Then when the brake band is expanded so that its ends move away from each other, the spring 114 urges the slide 110 to the left (Figs. 11 and 13) and the slide 120 accompanies it. Under normal conditions, the brake band will expand to such an extent that the slide 120 will be brought into a position wherein it nearly engages or actually engages the shoulder 123 but is not displaced relative to the slide 110. However if the brake lining becomes worn, the slide 120 will engage the shoulder 123 before the brake lining effectively engages the interior surface of the drum. Then when the brake band continues to expand to bring the brake lining into effective engagement with the drum, the spring 114 continues to displace the slide 110 to the left (Figs. 11 and 13) and if the brake lining is sufficiently worn, the teeth 117 will advance the distance of one tooth upon the teeth 118. Then when the brake band contracts, the slide 120 will engage the shoulder 122 before the slide 110 has returned to its original position within the block 108 and the brake band will be held in a slightly expanded condition. Obviously, the outer surface of the brake lining will then lie in close proximity to the interior surface of the brake drum and it will not be necessary during the succeeding operation to expand the brake band the relatively large amount it was expanded during the preceding operation. It will be noted that the slide 110 and the block 108 automatically adjust themselves to prevent too much play of the brake band within its drum. They limit angular displacement of the band around the axis of rotation of the drum.

Preferably formed integral with each brake band 47 adjacent the ends thereof are bracket members 76 and 77 which are provided with arcuate surfaces 78 and 79, respectively, adapted to ride in grooves 80 and 81, respectively, the grooves 80 and 81 being formed in a piston or plunger 83 and one end of a cylinder 84, respectively. The plunger 83 is preferably provided with an integral rack 86, the teeth of which mesh with the teeth of a pinion 89 preferably formed integral with a shaft section 90. The shaft section 90 is rotatably journaled in a boss 91 which is preferably formed integral with the cylinder 84 and preferably projects through an aperture 92 formed in the associated plate or disc 54. The aperture 92 is of larger diameter than the boss 91 and therefore permits the cylinder 84 to be displaced relative to the plate or disc 54. One end of the shaft section 90 is provided with a tongue 95 which rides in a groove 96 formed in a coupling member 97 which is provided with a tongue 100. The tongue 100 rides in a groove 101 formed in one end of a shaft section 102. It will be noted that the grooves 96 and 101 extend at right angles to each other when the apparatus is assembled in the manner shown in Fig. 3 and therefore the shaft sections 91 and 102 together with the coupling member 97 form a universal joint. The shaft section 102 is rotatably journaled in a bracket member 105 which closes the aperture 92 in the disc 54 and is rigidly secured to the disc. Rotatably and slidably journaled upon the shaft section 105 is a lever 107 provided with ratchet teeth 130 on its hub, the ratchet teeth 130 being engageable with ratchet teeth 131 formed upon a collar 132 which is constrained to rotate with the shaft section 102. Rigidly secured to one end of the shaft section 102 is a collar 134 and rotatably and slidably journaled upon the reduced portions of the collar 134 is one of the aforementioned levers 43. The hub of the lever 43 is provided with ratchet teeth 136 engageable with ratchet teeth 137 formed upon the collar 132. Slidably journaled in bores 140 formed in the bracket member 105 are plungers 141 which are urged against the lever 107 by compression springs 143 disposed in the bores 140, the arrangement being such that the springs 143 cooperate with the plungers 141 to yieldingly hold the lever 107 in a position wherein its ratchet teeth 130 effectively engage the ratchet teeth 131. Slidably journaled in bores 147 formed in the collar 134 are plungers 150 which are held in engagement with the lever 43 by springs 152, the springs 152 being disposed in the bores 147. The construction is such that the springs 152 cooperate with the plungers 150 to hold the lever 43 in a position wherein its ratchet teeth 136 effectively engage the ratchet teeth 137.

Angular displacement of the levers 107 in a counterclockwise direction (Fig. 5) around their respective shaft sections 102 is limited by a stop 155 preferably formed integral with the bracket member 105. Preferably formed integral with each lever 43 is a lug 157 provided with a bore 158 in which a plunger 159 is slidably journaled (see Fig. 9). A compression spring 160 disposed in the bore 158 urges the plunger 159 against the associated lever 107 and yieldingly holds the lever 107 in a position wherein a stop 162 preferably formed integral with the lever 107 engages the lever 43. Obviously, the stop 162 limits angular displacement of each pair of levers 107 and 43 in the direction away from each other.

Figure 4:
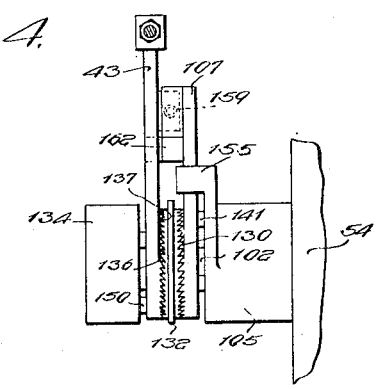
Fig. 4 is an elevation of automatically acting mechanism for taking up slack or wear in the brake mechanism shown in Fig. 1.

Referring to Figs. 4 and 5, it is apparent that if the levers 43 are displaced in a counterclockwise direction (Fig. 5) the ratchet teeth 131 may ride over the ratchet teeth 130 when the springs 143 yield so that the levers 107 can slide along the shaft sections 102, the ratchet teeth 136 and 137 being formed so that the ratchet teeth 136 can only slide over the teeth 137 when the levers 43 are angularly displaced in a clockwise direction (Fig. 5). However, the springs 160 are preferably of such strength that when the levers 43 are displaced in a counterclockwise direction (Fig. 5) the levers 107 will move in unison with the levers 43 until they engage the stops 155 and therefore, the ratchet teeth 131 do not slip over the ratchet teeth 130. If the levers 43 are angularly displaced in a counterclockwise direction (Fig. 5) after the levers 107 have engaged the stops 155, the springs 160 will yield so that the ratchet teeth 131 may ride over the ratchet teeth 130. When the brakes are properly adjusted, displacement of the levers 43 in a counterclockwise direction (Fig. 5) through an angle insufficient to cause the ratchet teeth 131 to ride over the ratchet teeth 130 the distance of one tooth will cause the collars 132 to angularly displace the shaft sections 102 through the same angles and this movement of the shaft sections 102 will cause the pinions 89 to displace the plungers 83 (Fig. 11) to the left to bring the forward ends of the brake bands 47 into positions wherein they hold their brake linings in effective engagement with the brake drums. The angle through which the pinions 89 travel causes them to bring the forward ends of the brake bands into these positions before the pinions have ceased to rotate and, therefore, after the forward ends of the brake bands have brought their brake linings into effective engagement with the drums, the cylinders 84 are displaced to the right (Fig. 11) so that the rear ends of the brake bands are brought into effective engagement with the brake drums. Of course, when the brake bands are expanded in this manner, they bring their entire friction linings into effective engagement with the brake drums and the automobile may be brought to a full stop or slowed down to any desired speed. If the brake linings have become worn so that the levers 43 must travel through a relatively large angle to bring the linings into effective engagement with the drums, the levers 43 will continue to be displaced in a counterclockwise direction after the levers 107 have engaged the stops 155. In other words, the operator must continue to depress the brake or foot pedal 37 after the levers 107 have engaged the stops 155. When this occurs the springs 160 yield and the ratchet teeth 131 advance over the ratchet teeth 130 a distance of one tooth. Then when the brake or foot pedal 37 is permitted to return to its original position the springs 160 elongate to bring the stops 162 into engagement with the levers 43. This relative movement of the levers 107 and 43 causes the ratchet teeth 137 to advance in a counterclockwise direction (Fig. 5) over the ratchet teeth 136 through the distance of one tooth and this angular displacement of the collars 132 is transmitted to the shaft sections 102 which is, in turn, transmitted to the pinions 89. The pinions 89 are thus brought into positions wherein they hold the brake bands 47 slightly expanded. Then the next time the brakes are operated, it will not be necessary to angularly displace the brake or foot pedal 37 through as large a distance as it was displaced in the preceding operation. It may be mentioned that the adjusting mechanism associated with the levers 43 and 107 is similar to that shown in my copending applications, Serial Numbers 203,588 and 257,396, filed July 5, 1927, and February 27, 1928, respectively which have subsequently become United States Patents Nos. 1,755,525 and 1,848,678 respectively, issued April 22, 1930, and March 8, 1932, respectively.

In Figs. 14 and 15 I have illustrated the construction of the front brakes 33. A comparison of Figs. 3 and 14 will show that the apparatus contained within the brake drums 45 is substantially identical with the apparatus contained in the brake drums of the brakes 33, the brake drums of the brakes 33 being designated by the reference character 40a. The shaft sections 90 of the brake drums 45 find their counter parts in the shaft sections 90a of the brakes 33. It will also be noted that I provide one of the aforementioned levers 43a for each of the brakes 33 and that the lever 43a is substantially identical in construction with the levers 43 provided in connection with the brakes 35. In connection with the levers 43a, I provide mechanism which resembles the take-up mechanism I provide in connection with the levers 43. Thus, I provide levers 107a in connection with the levers 43a and interposed between the hubs of the levers 43a and 107a are collars 132a which are substantially identical in construction with the aforementioned collars 132. Each collar 132a is keyed to a shaft section 180 and constrained to rotate with each shaft section 180 is a collar 134a which has the same functions as the aforementioned collars 134. Bores 147a provided in the collars 134a house compression springs 152a which urge plungers 150a against the levers 43a and yieldingly hold ratchet teeth 136a provided upon the levers 43a in engagement with ratchet teeth 137a provided upon the collars 132a. A bracket member 181 is provided for each shaft section 180, the bracket member 181 being rigidly secured by bolts 183, or the equivalent, to the longitudinal frame members 26 of the chassis. A plurality of plungers 141a slidably mounted in the bores 140a formed in each bracket member 181 are yieldingly urged against the associated lever 107a by compression springs 143a disposed in the bores 140a. The function of the compression springs 143a is to yieldingly hold the ratchet teeth 130a provided upon the associated lever 107a in engagement with the ratchet teeth 131a provided upon the collar 132a.

Arcuate lugs 185 preferably formed integral with each shaft section 180 cooperate with a grooved ball member 185 and a coupling member 187 to form a universal joint which is designated by the reference character 188. The coupling member 187 is pinned or otherwise secured to a sleeve 189 into which a square shaft 190 telescopes. The sleeve 189 resembles the shaft 190 in cross section and, therefore, the shaft 190 is constrained to rotate with the sleeve. Pinned or otherwise secured to one end of each shaft 190 is a collar 192 provided with integral lugs 193 which cooperate with a grooved ball member 194 and a coupling member 195 to provide a universal joint which is designated by the reference character 196. It will be noted that the coupling member 195 is pinned to the associated shaft section 90a. Obviously, when the levers 43a are displaced in a clockwise direction (Fig. 5) the shaft sections 90a will be rotated to expand brake bands 47a which form parts of the brakes 40a, the brake bands 47a being substantially identical with the aforementioned brake bands 47. As mentioned above, the mechanism associated with the levers 107a and 43a function in substantially the same manner as the mechanism associated with the levers 107 and 43 and is adapted to take up slack arising from wear, or the equivalent, in the front brakes or in mechanism whereby the levers 43a are operatively connected to the shaft sections 90a.

The open end of each brake drum 40a is preferably closed by a plate 54a and the plate 54a is preferably formed integral or is rigidly secured to an associated steering knuckle 200 pivoted to the front axle 29 in the usual manner. An aperture 92a formed in the plate 54a allows a boss 91a to project through the plate, the diameter of the boss 91a being less than the diameter of the aperture 92a so that the boss 91a may be displaced with respect to the plate 54a. The boss 91a preferably journals the associated shaft section 90a and is preferably formed integral with a cylinder 84a which is preferably identical in construction with the aforementioned cylinders 84. Of course, the mechanism disposed within the cylinders 84a and the mechanism which operatively connects the cylinders with the ends of the brake bands 47a is substantially identical to the mechanism which is contained in the cylinders 84 and which operatively connects the cylinders with the brake bands 47.

Each of the front brakes 33 comprises automatically adjustable mechanism for limiting angular displacement of the brake bands. This mechanism is substantially identical with that provided in the rear brakes and comprises slides 110a.

From the foregoing description, it is readily apparent that if the brake lever 37 is angularly displaced in a counter clockwise direction (Fig. 5) the levers 43 and 43a will actuate the brakes 33 and 35 and will bring the automobile to a stop or will slow it down to any desired speed. The levers 43a cooperate with levers 107 and additional mechanism to take up slack in the bands associated with the front brakes 33 and the levers 43 and 107 cooperate with other mechanism to take up slack in the bands associated with the rear brakes 35. Inside of each brake, means comprising a slide 110 or 110a is provided for limiting the angular displacement of the brake band around the axis of rotation of the brake drum, the means being adapted to automatically adjust itself to compensate for wear of the brake linings.

Referring now to Figs. 16 to 19, inclusive, I have shown a brake which embodies the invention and may be employed in place of the brakes 33 and 35, it being understood that the brake shown in Figs. 16 to 19, inclusive, may have details of its construction modified so that it may be utilized either as a front wheel brake or as a rear wheel brake. The brake shown in Fig. 16 is designated by the reference character 202 and preferably comprises a brake drum 40b engageable by a brake lining 48b carried by a brake band 47b. The brake band 47b is preferably formed by a stamping operation. Thus, I have preferably provided a blank 47c substantially of the form of that shown in Fig. 17. At 204 in Fig. 17, I have shown dotted lines along which the blank may be folded to provide inwardly extending tapered flanges 205 upon the brake band 47b. The flanges diminish in height from a point substantially midway between the ends of the brake band to points adjacent the ends thereof. This construction insures that the brake bands will expand into substantially true circles and does cause the friction linings to effectively engage the drums without causing undue wear on certain parts of the linings.

Lugs 76b and 77b are preferably secured to the ends of the brake band 47b, the lugs being provided with rounded heads substantially identical with the rounded heads provided upon the aforementioned lugs 76 and 77. The lug 76b rests in a slide formed in one end of a piston or plunger 83c which is slidably journaled in a cylinder 84c. The lug 77b rides in a slot formed in one end of the cylinder 84c. The plunger 83c and the cylinder 84c may be of the same construction as the plunger 83 and the cylinder 84, respectively, or may be of the same construction as the plunger 83a and the cylinder 84a, respectively. The construction employed is determined by the use to which the brakes are applied. Thus, if the brakes are to be used in connection with the front wheels, the plunger 83c and the cylinder 84c will preferably be substantially identical in construction with the plunger 83 and the cylinder 84, respectively. Tension springs 206 are arranged to yieldingly contract the brake band 47b and to hold it in sliding engagement with lugs 207 which are preferably formed integral with a plate 208 which closes one end of the brake drum 40b. One end of each spring 206 is secured to the brake band 47b and the other end thereof is preferably secured to the plate 208. Of course, the brake band 47b is preferably somewhat resilient and is preferably constructed so that it tends to assume the shape in which it is shown in Fig. 16. However, it may be expanded into a position wherein it holds its lining in engagement with the interior surface of the drum 48b. To prevent rotation of the brake band 47b relative to the plate 208, I preferably provide an inwardly tapered lug 210 which is riveted or otherwise secured to the brake band. As best shown in Figs. 16 and 21, the lug 210 rides in an outwardly flaring groove 212 formed in a bracket member 213 which is rigidly secured by bolts 214, or the equivalent to the plate 208. The construction is such that the brake band can move radially with respect to the axis of rotation of the drum but the drum can not angularly displace it to any material extent around the axis of rotation. The lug is preferably tapered as shown so that the brake band can be angularly displaced a limited distance around the axis of rotation of the drum when the brake band is expanded.

The lug 210 is preferably positioned on the rear portion of the band approximately 120° from the top thereof. Then, when the band is actuated when the car is moving backward, the efficiency of the brake is approximately equal to its efficiency when it is actuated when the car is moving forward. In other words, as shown in Fig. 16, the lug 210 and bracket member 213 are positioned a substantial distance to the rear of a vertical line extending through the axis of rotation of the brake drum and the approximate center of the brake band in a manner to provide a relatively and substantially greater wrap of the brake band when applied to check the movement of the vehicle in a forward direction than when applied to check the movement of the vehicle in a rearward direction, thereby providing a braking action approximately proportional to the normal requirements in the operation of the vehicle. Furthermore, by reason of the arcuate length of the lug 210 and the corresponding width of the groove 212 formed in the bracket member 213, a substantially greater wrap of the band is obtained on each side of the lug than would be possible in a structure wherein the lug or anchor had only a single point of engagement for holding it against angular displacement, thereby providing additional working surface in both directions due to the overlapping of the effective surfaces obtained by reason of the substantial arcuate length of the lug 210.

For example, assuming that the ends of the brake band are each positioned approximately 17° on each side of the vertical center line, and the lug 210 is positioned to the rear of the vertical center line in a manner to place the upper rear end of the lug 210 approximately 60° to the rear of the center line and the lower forward end of the lug 210 approximately 36° to the rear of the center line, it will be observed that if the brake is applied when the vehicle is moving in a forward direction and the drum rotating in a counter clockwise direction as viewed in Fig. 16, the most effective braking contact with the drum will be obtained over a distance approximating 223° of the brake band, while if the drum is rotating in a rearward direction, or clockwise as viewed in Fig. 16, and the brakes are applied, the most effective braking contact with the drum will be obtained throughout a portion of the brake band approximating 127° due to the arcuate length of the lug 210 and the overlapping of the most effective braking areas of the brake band when applied to check the movement of the vehicle in either a forward or rearward direction.

It will be observed from the foregoing description that owing to the normally greater speed of a vehicle in a forward direction, and therefore the desirability of greater braking power to check the forward movement thereof, as compared with the normally slower speed and lesser requirement to check the speed or movement of the vehicle in a rearward direction, the positioning of the lug 210 and its cooperating bracket 213 in the manner described serves to provide a braking action substantially proportional to the normal requirement for checking the movement of the vehicle in either a forward or rearward direction, it being observed also that an overlap of approximately 24° in the wrap of the brake band is attained, in the present instance, for checking the movement of the vehicle in either direction due to the arcuate length of the lug 210, thereby increasing the braking efficiency of the band when actuated to check the movement of the vehicle in either a forward or rearward direction, it being understood, of course, that the arcuate length of the lug 210 may be varied as desired to suit various conditions.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A brake comprising a rotatable brake drum, a brake band, a member provided with a groove the edges of which are substantially radial to the brake drum and spaced a substantial distance apart arcuately of the drum and held against rotation with respect to the drum, a lug rigidly secured to said brake band, said lug being substantially the same width as and having corresponding radial edges and being engageable with said groove to limit angular displacement of the brake band around the axis of rotation of the drum, and means for contracting the brake band and for yieldingly holding said lug in said groove.

2. A brake comprising a rotatable brake drum, an internal expanding brake band, a non-rotatable plate closing one end of said drum, a bracket having a groove of substantial arcuate width formed therein secured to said plate, said groove having substantially radial edges, a lug having a width substantially equal to that of the arcuate width of said groove and formed with corresponding radial edges and engageable therewith in a manner to provide an overlapping of the braking effect of the band when applied to retard the movement of the drum in either a forward or rearward direction, means for expanding the brake band, and resilient means for contracting the brake band in a manner to yieldingly urge said lug toward the bottom of said groove and for holding said band toward said plate.

JOHN W. TATTER.